United States Patent [19]

Galetto et al.

[11] 4,107,698

[45] Aug. 15, 1978

[54] INK JET PRINTER APPARATUS AND METHOD OF OPERATION

[75] Inventors: Louis Valentine Galetto, Apalachin; Donald Frederick Jensen, Endicott, both of N.Y.

[73] Assignee: International Business Machines Corporation, Armonk, N.Y.

[21] Appl. No.: 767,403

[22] Filed: Feb. 10, 1977

[51] Int. Cl.² .............................................. G01D 15/18

[52] U.S. Cl. .............................................. 346/75

[58] Field of Search .............................................. 346/75

[56] References Cited

U.S. PATENT DOCUMENTS

| | | | |
|---|---|---|---|
| 3,631,511 | 12/1971 | Keur et al. | 346/75 |
| 3,789,422 | 1/1974 | Haskall et al. | 346/75 |
| 3,827,057 | 7/1974 | Bischoff et al. | 346/75 |
| 3,828,354 | 8/1974 | Hilton | 346/75 X |
| 4,032,924 | 7/1977 | Takano et al. | 346/75 |

*Primary Examiner*—George H. Miller, Jr.
*Attorney, Agent, or Firm*—John S. Gasper

[57] ABSTRACT

In a magnetic ink jet printer a continuous stream of ferrofluid ink drops is projected toward a print medium. A magnetic selector located proximate the stream is operated in synchronism with the flight of the ink drops for deflecting individual unwanted ink drops into a drop catcher. Due to fringing effects produced by the selector when unwanted drops are selected, adjacent print drops are deflected a lesser amount from the initial stream trajectory. Print drops not affected by the fringe magnetic field produced to select unwanted drops are subjected to a compensation deflection depending on their position relative to the unwanted drops so that all print drops follow the same trajectory, after passing the magnetic selector in their travel through a vertical deflector and deposition onto the print medium.

6 Claims, 4 Drawing Figures

INK JET PRINTER APPARATUS AND METHOD OF OPERATION

BACKGROUND OF THE INVENTION

1. Field of the Invention

This invention relates to ink jet recording and particularly to a magnetic ink jet printing apparatus and its method of operation.

2. Description of the Prior Art

In the well-known ink jet recorders, a jet recorder projects a continuous stream of ink drops of substantially uniform size and spacing along an initial trajectory toward a print medium. Dot matrix patterns such as alphanumeric characters are formed by selectively removing individual drops from the stream and controllably dispersing the remaining or print drops to be deposited on the print medium. The dispersion of the print drops to form the desired characters is performed concurrently with and in a direction orthogonal to the direction of relative motion of the jet recorder and the print medium.

The selective removal of drops from the stream involves applying a selection force of short duration to individual drops as they move toward the print medium. The selection force is generally orthogonal to the stream and to the direction of the dispersion of the print drops. Drops subjected to the selection force are deflected to follow a second trajectory that leads to a drop catcher which intercepts the ink drops in advance of the print medium.

One of the problems associated with drop selection is that the act of applying the selection force to the individual ink drop also acts to a somewhat lesser degree on adjacent drops. If the drops adjacent the selected drop are intended to be print drops, the selection force causes them to be likewise deflected from the initial trajectory since the generation of the selection force, particularly as it is practiced with field controllable ink drops such as ferrofluid ink drops, produces fringe effects. The fringe effect is particularly pronounced where the drops are relatively closely spaced for increased print rates and density of character impression. The undesirable aspect of uncontrolled fringing is that the print drops are deflected toward the trajectory of the unused drops thereby making removal of unused drops much more critical in the location of the drop catcher. Furthermore, where printing requires that two or more print drops in succession follow an unused and selected ink drop, the lead and trailing print drops are deflected by the fringe force whereas intermediate print drops are substantially unaffected. The net result is to have successive print drops following different trajectories. This results in printing of irregularly shaped characters on the print medium.

Various attempts have been made to eliminate or reduce the fringe effect. See for example, a publication by W. T. Pimbley entitled "Magnetic Transducer With Shunts For Magnetic Ink Jet Recorder," in the IBM Technical Disclosure Bulletin, on pages 3556–3557, Vol. 17, No. 12, May 1975, and a publication by D. C. Lo and J. W. Mitchell entitled "Modified Selector For Magnetic Ink Jet Printing," in the IBM Technical Disclosure Bulletin, on pages 3121–3122, Vol. 18, No. 9, February 1976. Such fringe compensators use fringe shields or fringe suppressors. While such devices can be effective in many applications, particularly in magnetic ink jet printers, it is not always possible or desirable to use additional magnetic structures. Such compensators increase the density of packaging as well as introduce problems of crosstalk.

SUMMARY OF THE INVENTION

It is a general object of this invention to provide an improved ink jet printer apparatus.

It is more specific object of this invention to provice an improved ink jet printer which compensates for fringe effects in selecting ink drops.

It is a further object of this invention to provide an ink jet printer in which fringe compensation is obtained without the need for using additional structures to eliminate or suppress fringe forces.

It is a still further object of this invention to provide an improved magnetic ink jet printer having fringe magnetic field compensation.

Basically, the above as well as other objects are attained in accordance with this invention by applying a deflection force to the print drops which compensates for the deflection experienced or likely to be experienced by the print drops when selected drops are deflected for removal by a drop catcher. The compensation deflection force is applied to the print drops in such a manner that all the print drops follow the same trajectory after selection is made. The compensation deflection force is applied by the same selector which deflects the unwanted drops. For compensation, the selector is operated to produce a compensation force which is substantially the same order of magnitude as fringe force.

In the preferred embodiment, the invention is practiced in a magnetic ink jet printer which uses a field controllable magnetic ink such as a ferrofluid. A magnetic selector which produces magnetic field for deflecting the ink drops comprises a magnetic core and energizing coil. The coil is operated at one level of energization to select unwanted drops and at a second level of energization to apply a compensation force to print drops affected by the fringe magnetic field of the selector. A control means energizes the selector for selection and compensation depending on position of print drops relative to unwanted drops so that all print drops follow the same trajectory after passing the magnetic selector. In this way the magnetic selector can be relatively simple in construction. No additional magnetic structures are needed to suppress fringe magnetic fields which makes the jet recorder assembly relatively simple.

The foregoing and other objects, features and advantages of the invention will be apparent from the embodiments of the invention, as illustrated in the accompanying drawing.

DETAILED DESCRIPTION OF THE INVENTION

Figure 1:
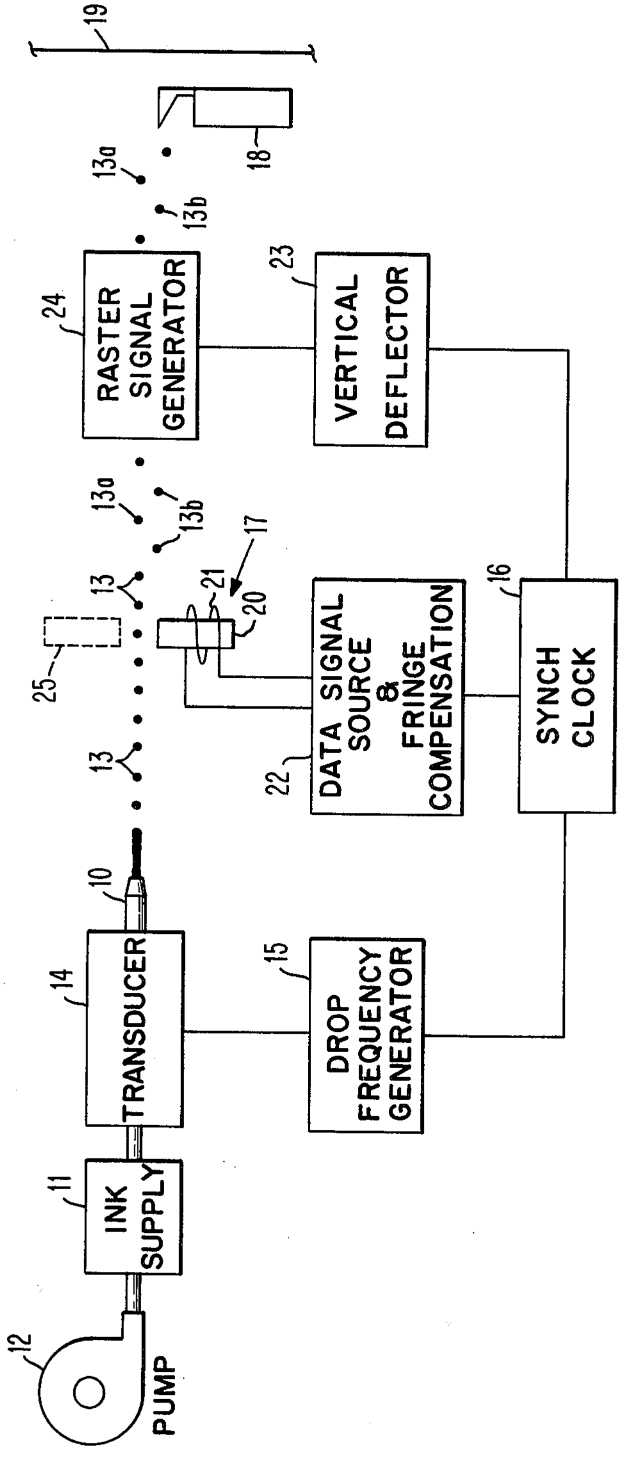
FIG. 1 is a block diagram of a magnetic ink jet printer for illustrating the invention.

As seen in FIG. 1, the magnetic ink jet printer system comprises nozzle 10 through which a constant stream of field controllable ink, such as a ferrofluid, is ejected under pressure from an ink supply 11 connected to pump 12. One suitable example of a ferrofluid ink is described in U.S. Pat. No. 3,805,272, issued to George J. Fan et al. on Apr. 16, 1974. Drops 13 are formed in the ink stream by a transducer 14, such as a piezoelectric or magnetostrictive element, which vibrates nozzle 10 at a predetermined frequency established by a drop frequency generator 15 operating under the control of a synchronizing clock 16.

After drops 13 are formed, they move along an initial trajectory past a selector 17 which when operated applies a deflection force to individual ink drops causing them to be deflected from the initial trajectory on a flight path which ultimately leads to a drop catcher 18 located near print medium 19.

In the preferred form in which this invention is practiced, selector 17 is a magnetic selector which comprises magnetic core 20 and 21 connected to be energized by electric signals from a data signal and fringe compensation source 22 which is connected to the synchronizing clock 16. The selector 17 may take various forms such as shown in the previously-mentioned U.S. Pat. of George Fan et al. or U.S. Pat. No. 3,979,797, issued to Donald F. Jensen on May 25, 1976, or in the publication of Edward F. Helinski made in the September 1975 IBM Technical Disclosure Bulletin, Vol. 18, No. 4, pp. 1053 and 1054. In any event, the magnetic core 20 is designed so that when coil 21 is energized a magnetic force is applied to individual ink drops 13 as they pass through the magnetic field produced in the vicinity of the ink stream trajectory. Thus, when current is applied to winding 21 by data signal source 22, a drop 13 aligned with magnetic core 20 is temporarily magnetized by the magnetic field produced by core 20 to cause the aligned drop 13 to experience the magnetic deflection force causing the drop to be diverted from its initial trajectory and into a trajectory leading to drop catcher 18. The ink drops used for printing, i.e., the print drops, as well as the unused drops, i.e., the selected drops, are dispersed in the vertical direction by vertical deflector 23 cyclically energized by raster scan signals from raster signal generator 24 connected to synchronizing clock 16. The printer system thus far described is well-knwon in the art. Further details of operation may be understood by reference to the previously-mentioned, as well as other, patents.

Due to the relatively close proximity of ink drops 13 during their flight from nozzle 10 and the relatively large region effected by the fringe portions of the magnetic field produced when selector 17 is energized, ink drops 13 not directly aligned with magnetic core 20 and adjacent to selected drops experience a partial deflection force hereinafter referred to as a fringe force, which tends to effect a partial deflection of the ink drops away from the initial trajectory. If the partially deflected ink drop is an unused drop, no particular problem is caused. However, if the adjacent partially deflected drop is a print drop, print quality is adversely affected. The effect of fringing forces can be more clearly understood by reference to FIG. 3. The ink drops **13*a*–13*c* are unused drops selected by energization of coil 21 of selector 17 for the time interval $T_0$–$T_3$, as shown by the superimposed waveform 30. The ink drops 13*h*–13*j* likewise are unused drops selected by energization of coil 21 of selector 17 for the time interval beginning at $T_7$ of waveform 30. Ink drops 13*d*–13*g* are print drops, which when coil 21 is de-energized during interval $T_3$–$T_7$ of waveform 30 are not removed from the stream. Ink drops 13*c* and 13*h* are located at the full deflection position of unused drops. Unused ink drops 13*a*, 13*b*, 13*i* and 13*j* are in locations representing full deflection plus a fringe deflection force which caused them to be deflected a greater angle relative to the initial trajectory (as shown by broken line 31) than unused drops 13*c* and 13*h*. Print drops 13*d* and 13*g* have been subjected to fringe deflection caused when the unused drops 13*c* and 13*h* were subjected to full deflection force. Print drops 13*e* and 13*f*, which are further removed from unused drops 13*c* and 13*h*, are virtually unaffected or only slightly affected to the same degree by fringing forces caused by the full deflection force being applied to the preceding and trailing unused ink drops. Thus, print drops 13*d* and 13*g*, when deflected by operation of vertical deflector 23 (see FIG. 1), will be misaligned relative to the print drops 13*e* and 13*f*** causing distortion of the printed symbol.

An apparent solution to the problem would be to separate the ink drops so that they are relatively unaffected by the fringe magnetic fields. Typically, however, for ink drops on 0.012 inch centers with a 0.006 inch thick magnetic core 20 of selector 17, the drop adjacent to a selected drop will receive 20 percent of the deflection of the selected drop. A useful equation which yields the approximate deflection of drops for 20 percent fringing is:

$$D_J = AI_J + 0.2AI_{J-1} + 0.2AI_{J+1}$$

where:

- $D_J$ is the deflection angle of the $J$th drop in radians;
- A is a constant of proportionality;
- $I_J$ is the average current supplied to the selector during the time interval ($1/f$) the $J$th drop is at the selector;
- $I_{J-1}$ is the average current on the selector during the time interval ($1/f$) the preceding drop is at the selector;
- $I_{J+1}$ is the average current on the selector during the time interval ($1/f$) the subsequent drop is at the selector.

Using the above equation, the deflection angles and the deflections at the gutter for 0.040 inch maximum deflection for various drop patterns are given in TABLE I.

TABLE I

| NO COMPENSATION | | | | |
|---|---|---|---|---|
| Drop | Preceding Drop | Succeeding Drop | Deflection Angle | Deflection At Gutter |
| Selected | Selected | Selected | 1.4 $AI_S$ | .040 inch |
| Selected | Selected | Print | 1.2 $AI_S$ | .034 inch |
| Selected | Print | Print | 1.0 $AI_S$ | .029 inch |
| Print | Selected | Selected | 0.4 $AI_S$ | .011 inch |
| Print | Selected | Print | 0.2 $AI_S$ | .006 inch |
| Print | Print | Print | 0 | 0 |

TABLE I shows a range in printed drop deflections of 0.011 inch; an error which is clearly unacceptable. In addition, the minimum separation between printed and selected drops is 0.018 inches.

Figure 4:
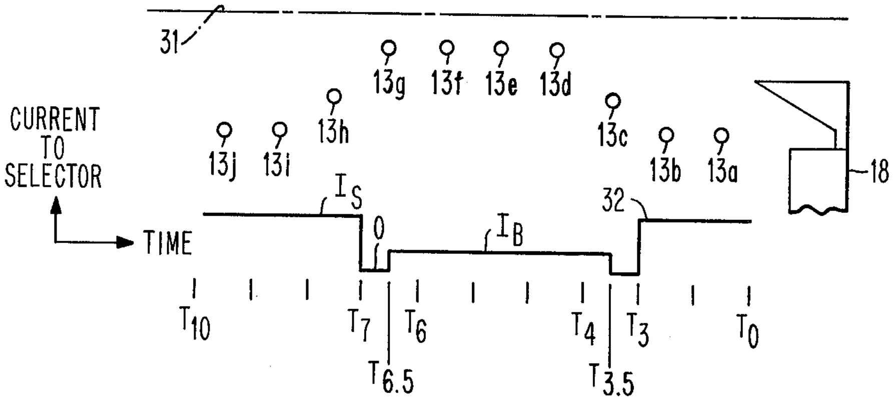
FIG. 4 is an enlarged view of the same portion of FIG. 1 as in FIG. 3 which illustrates ink drop position in stream when drop selector is operated by the circuit of FIG. 2.

As previously stated, this invention provides a simple means for bringing the print drops into alignment, thereby eliminating the drop placement error caused by selector fringe forces. Basically, the invention in the first embodiment involves applying a compensation force which will cause the print drops to be aligned on the same flight path in the specific embodiment shown in FIG. 1. The compensation force is obtained by energizing coil 21 with a compensation current, which causes the interior print drops 13*e* and 13*f* to align themselves with the leading and trailing print drops 13*d* and 13*g*. This may be seen more clearly in FIG. 4, where waveform 32 shows that the winding 21 is de-energized during the time interval $T_3$–$T_{3.5}$ and is partly energized with a compensation current $I_B$ during the time interval $T_{3.5}$–$T_{6.5}$. Again, during the time interval $T_{6.5}$–$T_7$ the winding 21 is de-energized. The compensation current $I_B$ energizes coil 21 during the time that print drops 13*e* and 13*f* are in alignment with the core 20. The magnitude of the compensation current $I_B$ is selected so that it essentially deflects the ink drops 13*e* and 13*f* by the same amount that the print drops 13*d* and 13*g* are deflected by the fringe force produced by $I_S$ when applied to the leading and trailing unused drops 13*c* and 13*h*. Also, the compensation current $I_B$ is such a magnitude that the fringe force produced by it upon the print drops 13*d* and 13*g* is substantially negligible. Thus, in this manner print drops 13*d*–13*g* are in alignment on a common trajectory for deflection by vertical deflector 23 and can be deposited in a straight line configuration to produce undistorted character symbols on the print medium 19.

The following equations express the relationship which controls the compensation current application for producing the compensating deflection.

(1) For print drop with adjacent print drops:

$$D_{pp} = AI_B + 0.2AI_B + 0.2AI_B = 1.4AI_B$$

(2) For print drop with one adjacent selected drop:

$$D_{ps} = A(I_B/2) + 0.2AI_S + 0.2AI_B = 0.2AI_S + 0.7AI_B$$

(3) For print drop with two adjacent selected drops:

$$D_{ss} = A(0) + 0.2AI_S + 0.2AI_S = 0.4AI_S$$

If $I_B = 0.2857I_S$, then:

$$D_{pp} = D_{ps} = D_{ss} = 0.4AI_S$$

The following TABLE II gives the values for deflection for the various drop patterns:

TABLE II

| WITH COMPENSATION | | | | |
|---|---|---|---|---|
| (J) Drop | (J − 1) Preceding Drop | (J + 1) Succeeding Drop | Deflection Angle | Deflection At Gutter |
| Selected | Selected | Selected | 1.4 $AI_S$ | .040 inch |
| Selected | Selected | Print | 1.229 $AI_S$ | .035 inch |
| Selected | Print | Print | 1.059 $AI_S$ | .030 inch |
| Print | Selected | Selected | 0.4 $AI_S$ | .011 inch |
| Print | Selected | Print | 0.4 $AI_S$ | .011 inch |
| Print | Print | Print | 0.4 $AI_S$ | .011 inch |

As seen from TABLE II and the application of the preceding series of deflection equations, all the print drops have the same deflection so that the drop displacement error due to fringing has been eliminated. The minimum separation between selected and print drops is approximately the same (0.019 inches for the specific example given previously) as in the uncompensated system set forth in TABLE I.

Figure 2:
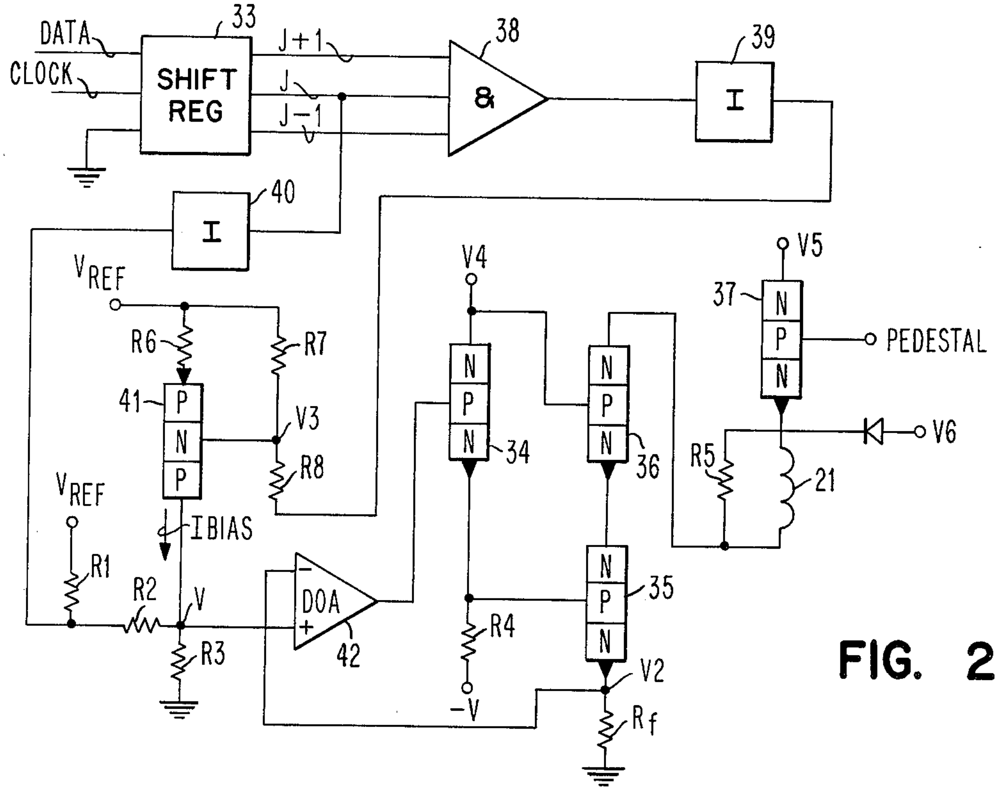
FIG. 2 is a detailed circuit diagram operable in accordance with this invention for controlling the ink drop selector of the printer shown in FIG. 1.
Figure 3:
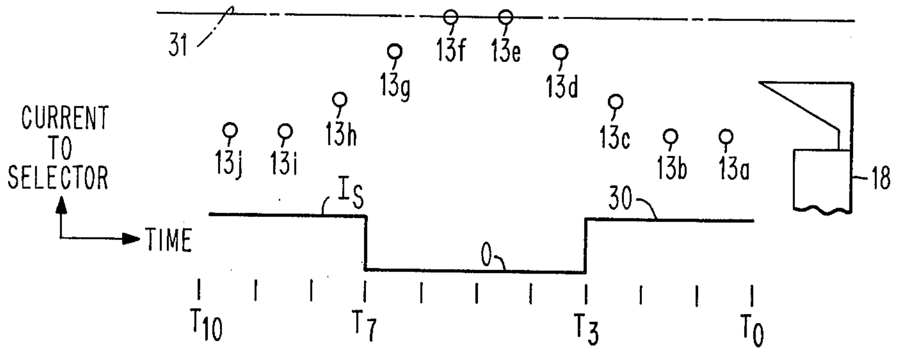
FIG. 3 is an enlarged view of a portion of the ink jet printer of FIG. 1 which illustrates the position of ink drops for a portion of the stream for a particular signal waveform applied to the selector not in accordance with the invention.

In FIG. 2, the data signal and fringe compensation source 23 is illustrated in detail. As shown, a shift register 33 is used to provide the information for drops to be printed (J), the preceding drop (J−1) and the succeeding drop (J+1). Data is provided to the input of the shift register (e.g., by a character generator, not shown) and is stepped through the shift register with pulses from synchronizing clock 16, which is running at the frequency of the drop generator 15. Data moves through the shift register from J+1 to J to J−1. Positive levels at J+1, J and J−1 are considered to be print data times. Transistors 34 and 35 in conjunction with DOA (Differential Operational Amplifier) 42 are connected in a voltage follower configuration so that V1 = V2. The current $I_S$ in selector coil 21 then becomes $V2/R_f$ or $V1/R_f$. Transistor 36 is connected in a common base configuration to provide improved bandwidth capability by eliminating the Miller effect from transistor 35. Transistor 37 is used to eliminate saturation of transistor 36 and to improve slewing due to the inductive effect of selector coil 21. Transistor 37 is also used to reduce the power dissipation in transistor 36, since it is only activated for one drop period when the current transition from 0 to $I_S$ occurs in winding 21. The logic is designed to look at three drop windows, as previously described. For the patterns shown in FIG. 3, the logic behaves as follows: drops 13*a*, 13*b* and 13*c* are the first window of operation and are all unused or selected drops. Therefore, the outputs of shift register 33, J+1, J and J−1 are negative. The output of the positive AND gate 38 is negative. The outputs of inverters 39 and 40 are unloaded collectors and consequently, V1 is established by $V_{REF} \cdot R3/(R1 + R2 + R3)$ or the current in winding 21 is $V1/R_f = V_{REF}R3/R_f(R1 + R2 + R3)$. By proper choice of the resistors R1, R2, R3 and $R_f$ and selection of $V_{REF}$ the selection current in coil 21 is established. For the next clock cycle the condition of the shift register 33 becomes print (J+1), select (J), select (J−1). Again, inverter circuits 39 and 40 are in the same condition and select current remains the same. The next clock cycle the condition becomes print (J+1), print (J), select (J−1). Now the output of inverter 40 goes to 0 and the output of the AND gate 38 is negative and, consequently, V1 is 0 since transistor 41 remains off. The current in coil 21 is now 0 since V2 is also 0. Therefore, drop 13*d* in FIG. 3 is printed. The next clock cycle would force the shift register 33 to the condition print (J+1), print (J), print (J−1) for drops 13*d*, 13*e* and 13*f*. In this condition, the J+1, J and J−1 lines of register 33 are positive. The output of AND gate 38 is positive and the outputs of inverters 39 and 40 are negative. With inverter 39 output negative, transistor 41 will conduct and act as a current source. The amount of current produced by transistor 41 is expressed in the following relationship:

$$IBIAS = [V_{REF} - (V3 + V_{BETI})]/R6$$

where:

$V_{BETI}$ = base-to-emitter voltage drop of transistor 41.
V3 is established by the resistor R7 and R8 and $V_{REF}$. Now the potential V1 is modified from 0 to a voltage defined by the following expression:

$$IBIAS \cdot R2R3/(R1 + R3)$$

This produces a current $I_B$ in winding 21 having a magnitude defined by the following expression:

$$IBIAS/R_f \cdot R2R3/(R1 + R3)$$

By proper selection of IBIAS with adjustment of the potential of resistor divider R7 and R8, the correct selector bias current is established. By continuing through the drop pattern shown in FIG. 3, it is readily seen that the current waveform produced is as shown.

While the invention, as illustrated, shows the application of compensation force to bring the print drops in line with print drops partially deflected by a fringe field, the invention can be practiced by compensating for the fringe effect by applying the compensation force in the reverse direction. Thus, print drops 13d and 13g would have a compensation force applied to them which counterbalanced the fringe deflection and whereas no compensation force would be applied to print drops 13e and 13f. Thus, print drops 13d–13g would be aligned substantially along the initial print trajectory of line 31. To accomplish this, the direction in which the compensation force is applied would be reversed from that shown in FIG. 1. This may be done by supplying a second selector element 25 (also suitably energized by data signal source 22) which applies the compensation force in the direction opposed to the selection force provided by selector 17 or it might utilize the dual selector configuration referenced earlier in the publications of Edward F. Helinski.

While the invention has been described in an embodiment of a magnetic ink jet printer. It is contemplated that the invention might likewise be utilized in other ink jet printer systems where electromagnetic or mechanical, pneumatic or other forces which produce fringe effects could also be compensated in substantially the same manner.

While the invention has been particularly shown and described with reference to preferred embodiments thereof, it will be understood by those skilled in the art that the foregoing and other changes in form and details may be made therein without departing from the spirit and scope of the invention.

We claim:

1. An ink jet printer apparatus comprising in combination,
   - means for projecting a continuous stream of individual ink drops toward a print medium;
   - means for selectively removing unwanted ink drops from said stream while allowing print drops to be deposited on said print medium including,
   - drop collector means positioned to prevent unwanted drops from depositing on said print medium,
   - selector means operable for deflecting ink drops of said stream for interruption by said drop collector; and
   - control means for operating said selector means for applying a first selection force capable of deflecting unwanted ink drops of said stream into a trajectory leading to said drop collector,
   - said control means including means for operating said selector means for applying to at least some of the print drops of said stream a second deflection force which compensates for fringe deflection forces produced by said first selection force on said print drops whereby said print drops are caused to move in a common trajectory which avoids said drop collector means.

2. An ink jet printer apparatus in accordance with claim 1 in which
   - said second deflection force is selectively applied to individual print drops by said control means dependent on their proximity to unwanted ink drops subjected to said first deflection force.

3. An ink jet printer apparatus in accordance with claim 2 in which
   - said second deflection force is applied by said control means to print drops unaffected by fringe deflection forces associated with said first deflection force whereby print drops unaffected by fringe deflection forces are caused to move in a common trajectory with print drops deflected by said fringe deflection forces.

4. An ink jet printer apparatus in accordance with claim 1 in which
   - said ink drops are field controllable ink drops, and
   - said selector means comprises transducer means operable by said control means for generating a force field proximate said stream for applying said first and second deflection forces to said unwanted and said print drops.

5. An ink jet printer apparatus in accordance with claim 4 in which
   - said first controllable ink drops are magnetic ink drops, and
   - said transducer means comprises a magnetic selector operable for generating a magnetic force field in the vicinity of said stream.

6. An ink jet printer apparatus in accordance with claim 5 in which
   - said magnetic selector comprises
     - a magnetic core element located in the vicinity of said stream for generating a gradient magnetic field proximate said stream,
     - said gradient magnetic field operating to apply a deflection force to individual magnetic ink drops in said stream,
     - an energizing winding on said magnetic core for producing flux in said core for the generation of said gradient magnetic field, and
   - said control means comprises circuit means selectively operable for applying first and second levels of current to said energizing winding for producing said first and second deflection forces on said magnetic ink drops in synchronism with the alignment of said unwanted and said print magnetic ink drops with said magnetic core element.

* * * * *